US012115867B2

(12) United States Patent
Zethraeus et al.

(10) Patent No.: US 12,115,867 B2
(45) Date of Patent: Oct. 15, 2024

(54) METHOD, CONTROL CIRCUIT AND CONTROL SYSTEM FOR CONTROLLING AN ELECTRICAL POWER COLLECTOR OF A VEHICLE TO COLLECT ELECTRICAL POWER FROM A TRACK LINE OF AN ELECTRIC ROAD SYSTEM

(71) Applicant: ELONROAD AB, Lund (SE)

(72) Inventors: Dan Zethraeus, Lund (SE); Andreas Sörensen, Lund (SE)

(73) Assignee: ELONROAD AB, Lund (SE)

( * ) Notice: Subject to any disclaimer, the term of this patent is extended or adjusted under 35 U.S.C. 154(b) by 300 days.

(21) Appl. No.: 17/618,074

(22) PCT Filed: Jun. 11, 2020

(86) PCT No.: PCT/EP2020/066214
§ 371 (c)(1),
(2) Date: Dec. 10, 2021

(87) PCT Pub. No.: WO2020/249680
PCT Pub. Date: Dec. 17, 2020

(65) Prior Publication Data
US 2022/0297544 A1    Sep. 22, 2022

(30) Foreign Application Priority Data

Jun. 13, 2019  (SE) .................... 1950714-4

(51) Int. Cl.
*B60L 5/39*        (2006.01)
*B60L 53/14*       (2019.01)
(Continued)

(52) U.S. Cl.
CPC ............. *B60L 5/39* (2013.01); *B60M 1/02* (2013.01); *B60M 1/30* (2013.01); *G06T 7/70* (2017.01);
(Continued)

(58) Field of Classification Search
CPC .. B60L 5/39; B60L 53/14; B60L 53/32; B60L 53/36; B60L 53/37; B60M 1/02;
(Continued)

(56) References Cited

U.S. PATENT DOCUMENTS 11,180,039 B2 *  11/2021  Kimoto ................. H02J 50/005
11,718,194 B2 *   8/2023  Miler ..................... B60L 53/665
                                                            320/109

(Continued)

FOREIGN PATENT DOCUMENTS

EP      2541730 A1 *  1/2013  .............. B60L 5/005
EP      3390136 A1    10/2018
(Continued)

OTHER PUBLICATIONS

International Search Report from International Application No. PCT/EP2020/066214 mailed Jun. 11, 2020.
(Continued)

*Primary Examiner* — Babar Sarwar
(74) *Attorney, Agent, or Firm* — Shih IP Law Group, PLLC

(57) ABSTRACT

The present invention relates to a method for controlling an electrical power collector configured to collect electrical power from a track line of an electric road system arranged along a road. The track line comprising activatable light indicators arranged on the track line. The electrical power collector being mounted on a vehicle. The method comprising, while the vehicle is driving, capturing, using a camera mounted on the vehicle, a video stream depicting the track line, identifying active light indicators in the captured video stream, and upon identification of active light indicators, activating the electrical power collector such that a sliding
(Continued)

contact of the electrical power collector makes sliding contact with the track line. Also a control circuit and a control system is presented.

24 Claims, 4 Drawing Sheets

(51) Int. Cl.
*B60L 53/36* (2019.01)
*B60L 53/37* (2019.01)
*B60M 1/02* (2006.01)
*B60M 1/30* (2006.01)
*G06T 7/70* (2017.01)
*G06V 20/56* (2022.01)

(52) U.S. Cl.
CPC .............. *G06V 20/56* (2022.01); *B60L 53/14* (2019.02); *B60L 53/36* (2019.02); *B60L 53/37* (2019.02); *G06T 2207/10016* (2013.01); *G06T 2207/30252* (2013.01); *H02J 2310/48* (2020.01)

(58) Field of Classification Search
CPC ................... B60M 1/30; G05D 1/0234; G05D 2201/0213; G06T 2207/10016; G06T 2207/30252; G06T 7/70; G06V 20/56; H02J 2310/48; Y02T 10/70
See application file for complete search history.

(56) References Cited

U.S. PATENT DOCUMENTS

| 2010/0090135 | A1 | 4/2010 | Kumar | |
|---|---|---|---|---|
| 2012/0067684 | A1* | 3/2012 | Asplund | B60M 1/34 191/48 |
| 2013/0245876 | A1* | 9/2013 | Messerschmidt | B60L 5/04 701/22 |
| 2014/0125286 | A1* | 5/2014 | Cho | B60L 50/51 320/128 |
| 2016/0090007 | A1* | 3/2016 | Buehs | B60L 5/36 191/33 R |
| 2016/0114683 | A1* | 4/2016 | Bruce | B60L 1/00 903/904 |
| 2019/0054833 | A1* | 2/2019 | Öhman | B60L 53/14 |
| 2020/0001731 | A1* | 1/2020 | Gerfast | B60L 53/305 |
| 2020/0290482 | A1* | 9/2020 | Jones | B60K 1/00 |

FOREIGN PATENT DOCUMENTS

| FR | 2808588 A1 | 11/2001 | | |
|---|---|---|---|---|
| KR | 20170092855 A | 8/2017 | | |
| WO | WO-2014180488 A1 * | 11/2014 | ......... | B60H 1/00642 |
| WO | WO-2017080619 A1 * | 5/2017 | ................ | B60L 5/42 |
| WO | WO2017102029 A1 | 6/2017 | | |
| WO | 2018/149478 A1 | 8/2018 | | |

OTHER PUBLICATIONS

Notification of Reasons for Rejection mailed Feb. 17, 2023 from JP Application No. 2021-573786, 8 pages.
Office Action from EP Application No. 20732569.7 mailed Jan. 23, 2023, 8 pages.

* cited by examiner

METHOD, CONTROL CIRCUIT AND CONTROL SYSTEM FOR CONTROLLING AN ELECTRICAL POWER COLLECTOR OF A VEHICLE TO COLLECT ELECTRICAL POWER FROM A TRACK LINE OF AN ELECTRIC ROAD SYSTEM

CROSS-REFERENCE TO RELATED APPLICATION

This Application is the National Stage filing under 35 U.S.C. § 371 of PCT Application Ser. No. PCT/EP2020/066214 filed on Jun. 11, 2020, which claims the benefit of European Patent Application No. 1950714.4 filed on Jun. 13, 2019. The disclosures of both applications are hereby incorporated herein by reference in their entireties.

TECHNICAL FIELD

The present inventive concept relates to a method for controlling an electrical power collector of a vehicle, driving on an electric road system arranged along a road, to collect electrical power from a track line of the electric road system.

BACKGROUND

Over the past years, electric vehicles such as electric cars have developed rapidly. Most current electric vehicles are powered by lithium-ion batteries. The lithium-ion batteries are more stable and offer a higher charging capacity, compared to the conventional batteries such as lead or nickel batteries.

However, the use of electric vehicles is limited by capacity of batteries and also by electric vehicle charging infrastructure. In addition, considering the growing demand of electric vehicles, the demand for electric vehicle charging infrastructure would be even higher in the coming years.

SUMMARY

An objective of the present inventive concept is to address this need. Further and alternative objectives may be understood from the following.

According to a first aspect a method is provided for controlling an electrical power collector. The electrical power collector is configured to, via a sliding contact, collect electrical power from a track line of an electric road system arranged along a road. The track line comprising activatable light indicators arranged on the track line. The electrical power collector is mounted on a vehicle. The method comprises, while the vehicle is driving, capturing, using a camera mounted on the vehicle, a video stream depicting the track line, identifying active light indicators in the captured video stream, and upon identification of active light indicators, activating the electrical power collector such that the sliding contact makes sliding contact with the track line.

The capturing of the video stream by the camera to identify active light indicators provides a convenient and efficient way of activating the electrical power collector. Further, wear on the sliding contact may be reduced. This since activation of the electrical power collector may be controlled based on a state of the track line, the light indicators indicating an active track line or not.

By an electric road system is hereby meant an electric system arranged along a road configured to provide electrical power to e.g. vehicles driving on that road.

By a vehicle is hereby meant an electric vehicle which is driven by an electric motor. For instance, the electric vehicle may be an electric car, an electric truck or an electric buss. The electric vehicle may comprise one or more chargeable batteries providing electrical power to the electric motor.

By a track line is hereby meant a line arranged along a road. The track line may form a part of the electronic road system. The track line may be arranged on a surface of a road. The track line may be arranged within a road surface of the road. The track line may be arranged along a central portion of a lane of the road.

By an electrical power collector is hereby meant an electrical component configured to collect electrical power. The electrical power collector may be mounted on the electric vehicle. The electrical power collector may provide electrical power for driving the electric motor of the electric vehicle. The electrical power collector may provide electrical power for charging batteries of the electric vehicle.

By a sliding contact is hereby meant a contact collecting electrical power form the track line. The sliding contact may be set in sliding contact with the track line in order to collect electrical power form the track line while the electric vehicle is driving along the track line.

The method may further comprise identifying positions of active light indicators, arranged on the track line, within images of the video stream, and laterally, with respect to a longitudinal direction of the track line, guiding the sliding contact based on the identified positions of the active light indicators. The capturing of the video stream by the camera to identify the positions of the active light indicators provides an input about the position of the vehicle with respect to the track line of the electric road system. The obtained input allows guiding the sliding contact of the vehicle with respect to the track line and hence allows collecting electrical power from the track line. Thereby, the vehicle collects electrical power from the track line of the electric road system while the vehicle is driving. This in turn reduces the demand of electric vehicle charging stations e.g. at parking stations and also allows driving the vehicle for a longer time than charged batteries provide the electrical power. Further, by guiding the sliding contact of the vehicle with respect to the track line, the track line may be integrated in a road surface of the road. Especially, a contact surface of the track line making contact with the sliding contact of the vehicle may be in level with the road surface.

The step of guiding the sliding contact may comprise moving the sliding contact laterally with respect to a longitudinal direction of the electric vehicle. Thereby, the position of the sliding contact with respect to the track line may be adjusted allowing the sliding contact to collect electrical power from the track line while the electric vehicle is driving along the track line. The sliding contact may have a width, a dimension in the lateral direction of the electric vehicle, corresponding to a width of the track line, i.e. a dimension in the lateral direction of the track line.

By a longitudinal direction of a vehicle is hereby meant a driving direction of the vehicle. By a lateral direction of a vehicle is hereby meant a direction perpendicular to the longitudinal direction of the vehicle. By a longitudinal direction of the track line is hereby meant a direction along the track line. By a lateral direction of a track line is hereby meant a direction perpendicular to the longitudinal direction of the track line.

The step of guiding the sliding contact may comprise steering the electrical vehicle laterally with respect to a longitudinal direction of the track line. Thereby, adjusting the position of the sliding contact with respect to the track line may be adjusted to allow collecting electrical power from the track line while the electric vehicle is driving along the track line. By steering the electrical vehicle, the complexity of the sliding contact may be reduced. For example, the sliding contact itself may not need to be moveable in the lateral direction of the electric vehicle.

The method may further comprise determining that the vehicle is approaching a portion of the electric road system, and activating the light indicators of that portion in response thereto. Thereby, the light indicators may not need to be active all the time. Hence, energy may be saved.

The method may further comprise determining that the vehicle is leaving the portion of the electric road system, and deactivating the light indicators of that portion in response thereto. The deactivation of the light indicators when the vehicle leaves the portion of the electric road system may reduce electrical power consumption of the light indictors.

The method may further comprise monitoring a lateral movement of the vehicle, and upon the lateral movement is above a predetermined threshold, deactivating the electrical power collector such that the sliding contact is prevented from making sliding contact with a surface of the road. With that the sliding contact is making sliding contact with something is meant that the sliding contact is making physical contact with this something while the vehicle is moving. Hence, the electrical power collector may be deactivated when the vehicle is steered away from the track line, e.g. in connection with a lane change or a departure from the road comprising the electric road system. The deactivation of the electrical power collector by preventing the sliding contact from making sliding contact with the surface of the road may be performed by lifting and/or tilting the sliding contact towards the electric vehicle, i.e. away from the surface of the road. By preventing the sliding contact to make sliding contact with the surface of the road may prevent the sliding contact from undesired wear and thereby increase a life span of the sliding contact.

By a predetermined threshold is hereby meant a predetermined value of the lateral movement. The predetermined threshold value may be set by a driver based on preferences of the driver. The predetermined threshold value may be a factory set value. The predetermined threshold value may be updated via over the air updates of the electrical vehicle.

The method may further comprise, upon not identifying active light indicators in the captured video stream, deactivating the electrical power collector such that the sliding contact makes no sliding contact with the track line or a surface of the road. Hence, a convenient and efficient way of deactivating the electrical power collector is provided. Further, the life span of the sliding contact may be enhanced. This since wear from e.g. the sliding contact make sliding contact with the surface of road may be prevented.

According to a second aspect a control circuit for controlling an electrical power collector configured to collect electrical power from a track line of an electric road system arranged along a road is provided. The track line comprising activatable light indicators arranged on the track line. The electrical power collector and the control circuit being mounted on a vehicle. The control circuit comprises: a camera configured to capture a video stream depicting the track line; and a processor configured to execute: a light indicator finding function configured to identify active light indicators within images of the video stream and, upon identification of active light indicators, generate an electrical power collector activation signal.

By identifying active light indicators, a convenient and efficient way of activating the electrical power collector is provided. Further, wear on a sliding contact of the electrical power collector may be reduced. This since activation of the electrical power collector may be controlled based on a state of the track line, the light indicators indicating an active track line or not.

The control circuit together with the electrical power collector may be as a package to be installed on vehicles allowing them to collect electrical power from the track line of the electric road system.

The light indicator finding function may further identify positions of active light indicators, arranged on the track line, within images of the video stream. The processor may further be configured to execute a sliding contact guiding function configured to generate a guiding signal based on the identified positions of the active light indicators. Thereby the control circuit may guide a sliding contact of the electrical power collector, while the vehicle is driving, to collect electrical power from the track line of the electric road system arranged along the road.

The above mentioned features of the method according to the first aspect, when applicable, apply to this second aspect as well. In order to avoid undue repetition, reference is made to the above.

The control circuit may further comprise an actuator configured to move the sliding contact laterally with respect to the longitudinal direction of the vehicle, based on the guiding signal, thereby guiding the sliding contact. Thereby the actuator may move the sliding contact based on the guiding signal. This may in turn allow the sliding contact to collect electrical power from the track line of the electric road system arranged along the road while the vehicle is driving along the track line.

The processor may further be configured to execute a vehicle steering function configured to steer the vehicle laterally with respect to a longitudinal direction of the track line based on the guiding signal, thereby guiding the sliding contact. Thereby, allowing the sliding contact to collect electrical power from the track line of the electric road system arranged along the road while the vehicle is driving along the track line.

The processor may further be configured to execute a vehicle movement detection function configured to: monitor a lateral movement of the vehicle, and upon the lateral movement is above a predetermined threshold, generate an electrical power collector deactivation signal. Thereby, a deactivation signal may be generated when the vehicle is steered to change lane or departure from the road comprising the electric road system. The deactivation signal may prevent the sliding contact from making a sliding contact with the surface of the road and thereby reducing wear on the sliding contact. The preventing the sliding contact from making sliding contact with the surface of the road may be performed by e.g. lifting or tilting the sliding contact towards the vehicle i.e. away from the surface of the road.

The light indicator finding function may further be configured to identify no active light indicators within images of the video stream, and upon identification of no active light indicators, generate an electrical power collector deactivation signal. The generation of the electrical power collector activation or deactivation signal may respectively activate or deactivate the electrical power collector. This in turn may increase a life span of the sliding contact.

According to a third aspect a control system for controlling an electrical power collector configured to collect electrical power from a track line of an electric road system arranged along a road is provided. The electrical power collector is mounted on a vehicle. The control system comprises a plurality of activatable light indicators arranged along the track line, and a control circuit according to the second aspect.

The plurality of the light indicators and the control circuit allow controlling of the electrical power collector, such as activation/deactivation of the same. The plurality of the light indicators and the control circuit further allow guiding of a sliding contact of the electrical power collector of the vehicle driving along the road comprising the electric road system to collect electrical power from the track line of the electric road system. The above mentioned features of the method according to the first aspect or the control circuit according to the second aspect, when applicable, apply to this third aspect as well. In order to avoid undue repetition, reference is made to the above.

The control system may further comprise a control server comprising a server control circuit configured to execute a light indicator control function configured to individually activate/deactivate each of the plurality of light indicators. The individual activation/deactivation of each of the plurality of light indicators may facilitate identification of the positions of the active light indicators by the camera. It may also reduce electrical power consumption of the light indictors i.e. at least reduced electrical power consumption when the light indicators are deactivated.

The server control circuit may further be configured to execute a vehicle position determining function configured to determine a position of the vehicle. The light indicator control function may be configured to, based on the position of the vehicle, determine whether the vehicle is approaching a portion of the track line comprising a specific track segment. The light indicator control function may further be configured to activate light indicators of the portion of the track line approached by the vehicle. The light indicator control function may further be configured to, based on the position of the vehicle, determine whether the vehicle is leaving a portion of the track line comprising a specific track segment. The light indicator control function may further be configured to deactivate the light indicators of the portion of the track line left by the vehicle. Thereby the respective activation or deactivation of the light indicators of the portion of the electric road system approached or left by the vehicle may be performed based on an input form the vehicle position determining device of the control system. The vehicle position determining device may be connected to the internet e.g. over a 4G network. The vehicle position determining device may be connected to a global positioning system (GPS) to determine the position of the vehicle. The vehicle position determining device may be connected to a network of traffic cameras to determine the position of the vehicle.

The light indicators, in active state, may be configured to emit green light. The light indicator, in deactive state, may be configured to emit red light. The light indicators may be configured to emit another light in active or deactive state. According to experiments performed by the inventors, the use of the green light for the active state facilitates the detection of the positions of active light indicators by the camera.

Each of the plurality of light indicator may comprise two or more individual light sources. Hence, the redundancy of the light indicators may be enhanced. This since if one of the light sources of a light indicator stops working the light indicator may still be functional in providing guidance for the sliding contact. Safety and reliability of the control system may hence be enhanced. The light source(s) of the light indicators may be based on LEDs. Durable and low power light sources are thereby provided.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a camera" or "the camera" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes are exaggerated for illustrative purposes and, thus, are provided to illustrate the general structures of embodiments of the present invention. Like reference numerals refer to like elements throughout.

FIG. 1.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
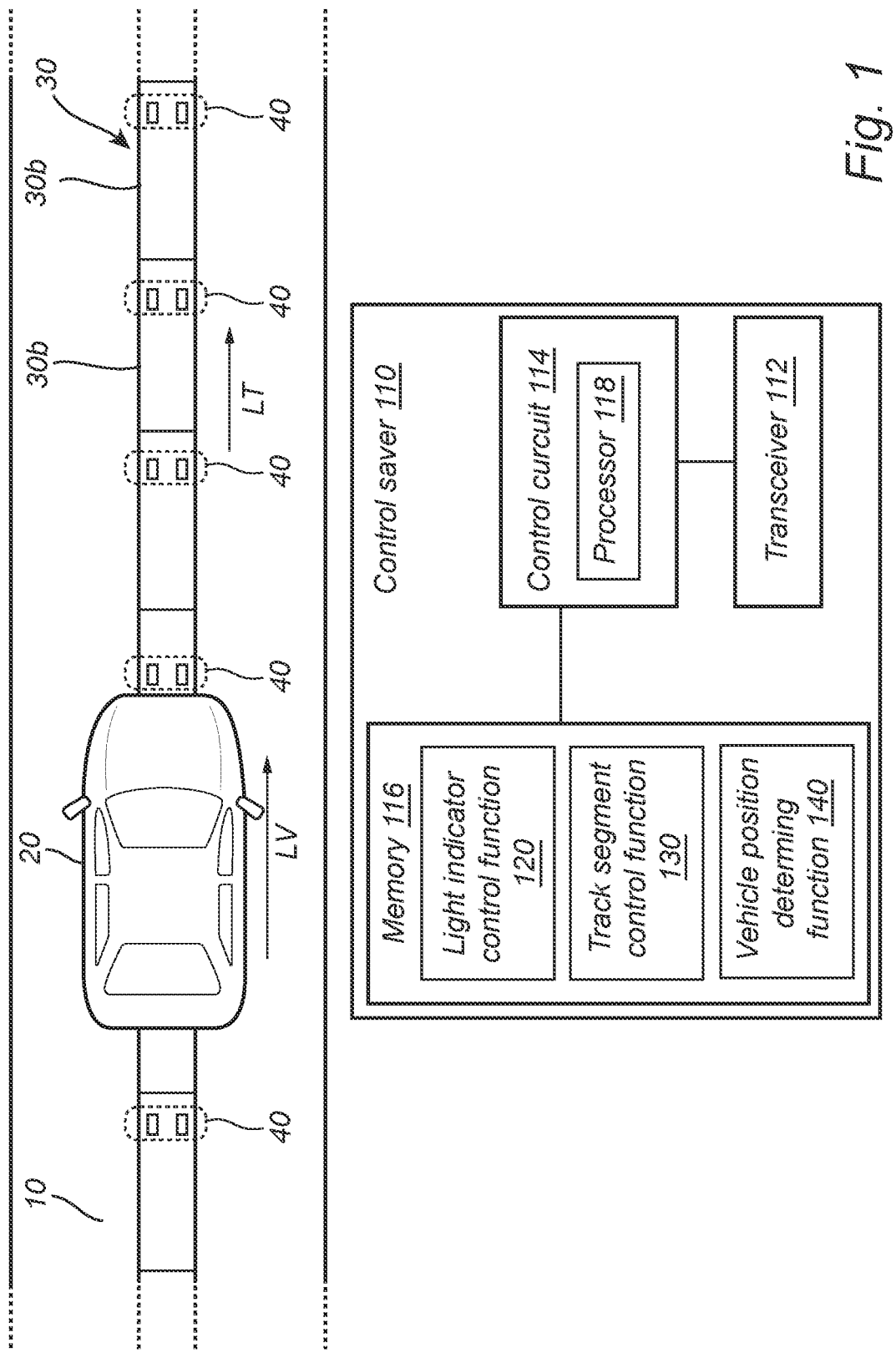
FIG. 1 is a top view of an electric road system arranged on a road.

In connection with FIG. 1, an electric road system is illustrated. The electric road system is arranged in connection with a road 10. In FIG. 1 a vehicle 20, here in the form of an electric car, is driving on the road 10. A longitudinal direction LV of the vehicle 20 is shown in FIG. 1. The general function of the electric road system is that it provides electrical power to the vehicle 20 driving along the road 10. Thus, an electric motor of the vehicle 20 can be provided with electric power from the electric road system while the vehicle 20 is driving on the road 10. Alternatively, or in combination, a battery of the vehicle 20 can be charged while the vehicle 20 is driving on the road 10.

The electric road system may comprise a track 30, as shown in FIG. 1. The track 30 is arranged to provide electrical power to the vehicle 20. A longitudinal direction LT of the track line 30 is shown in FIG. 1. As shown in FIG. 1, the longitudinal direction LV of the vehicle 20 is aligned with the longitudinal direction LT of the track line 30. In other words, they are parallel with respect to one another. The track 30 may be arranged on the surface of the road 10. The track 30 may protrude from the surface of the road 10. The track 30 may be arranged within a road surface of the road 10. The track 30 may be in level with the road surface of the road 10.

The track 30 is segmented into two different types of track segments 30a, 30b. A length of each track segment may be in a range from 25 cm to 200 cm, preferably 30-150 cm. A width of each segment may be in a range from 4 cm to 40 cm. The track segments 30a, 30b may be separated along the track 30 by electrically isolating members (not shown in FIG. 1). A first type of track segments 30a may be individually activated/deactivated to carry an electrical potential in its active state. A second type of track segments 30b may be track segments electrically connected to ground. Every second track segment of the track line 30 may be a track segment of the first type 30a. Every second track segment of the track line 30 may be a track segment of the second type 30b.

The track line 30 further comprises a plurality of light indicators 40 arranged along the track line 30. Each track segment 30a, 30b of the track line 30 may comprise a light indicator 40. Alternatively, the track segments of the first type 30a may comprise a light indicator 40. Each light indicator 40 may comprise two or more individual light sources. Each light source may comprise one or more LEDs. The light sources may emit green light, red light, or any other color light. A color of the light indicator 40 may vary based on if the track segment of the first type 30a associated with the light indicator 40 is in an activated or deactivated state. For instance, a light indicator 40 may emit a green light upon the track segment 30a associated with the light indicator 40 is in the active state. The light indicator 40 is said to be in an active state when it is set to emit light in response to that a track segment of the first type 30a associated with the light indicator 40 is in an activate state. A light indicator 40 may emit a red light upon the track segment of the first type 30a associated with light indicator 40 is in the deactivated state. Alternatively, a light indicator 40 may be off, i.e. emitting no light, upon the track segment of the first type 30a associated with light indicator 40 is in the deactivated state. The light indicator 40 is said to be in a deactivate state when it is set to emit light or set to be off in response to that a track segment of the first type 30a associated with the light indicator 40 is in a deactivate state. The light indicators 40 may be arranged with an interval of 1 meter along the track line 30.

The electric road system may further comprise control server 110. The control server 110 comprises a transceiver 112, a server control circuit 114 and a memory 116.

The transceiver 112 is configured to communicate with the vehicle 20. The communication with the vehicle is typically made wirelessly. Suitable protocols for wireless communication, both long range and short range are well known to the skilled person and will not be discussed in any detail. The transceiver 112 is further configured to individually communicate with the plurality of light indicators 40. This in order to send activation/deactivation signals to the respective light indicator 40. The communication may be made wirelessly or wired. The transceiver 112 is further configured to individually communicate with the track segments of the first type 30a. This in order to send activation/deactivation signals to the respective track segment of the first type 30a. The communication may be made wirelessly or wired.

The control circuit 114 is configured to carry out overall control of functions and operations of the control server 110. The server control circuit 114 may include a processor 118, such as a central processing unit (CPU), microcontroller, or microprocessor. The processor 118 is configured to execute program code stored in the memory 116, in order to carry out functions and operations of the control server 110.

The memory 116 may be one or more of a buffer, a flash memory, a hard drive, a removable media, a volatile memory, a non-volatile memory, a random access memory (RAM), or another suitable device. In a typical arrangement, the memory 116 may include a non-volatile memory for long term data storage and a volatile memory that functions as system memory for the control circuit 116. The memory 116 may exchange data with the server control circuit 114 over a data bus. Accompanying control lines and an address bus between the memory 116 and the server control circuit 114 also may be present.

Functions and operations of the control server 110 may be embodied in the form of executable logic routines (e.g., lines of code, software programs, etc.) that are stored on a non-transitory computer readable medium (e.g., the memory 116) of the control server 110 and are executed by the server control circuit 114 (e.g., using the processor 118). Furthermore, the functions and operations of the control server 110 may be a stand-alone software application or form a part of a software application that carries out additional tasks related to the control server 110. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The server control circuit 114 may execute a light indicator control function 120. The light indicator control function 120 is configured to individually activate/deactivate each of the plurality of light indicators 40. The server control circuit 114 may further execute a track segment control function 130. The track segment control function 130 is configured to activate/deactivate the track segments of the first type 30a. The light indicator control function 120 and the track segment control function 130 may be set to be synchronized. That is, upon the track segment control function 130 activates a track segment of the first type 30a, the light indicator control function 120 may be set to active one or more light indicators 40 associated with the activated track segment of the first type 30a.

The server control circuit 114 may execute a vehicle position determining function 140. The vehicle position determining function 140 is configured to determine a position of the vehicle 20.

The track segment control function 130 may be configured to, based on the position of the vehicle 20, determined by the vehicle position determining function 140, determine whether the vehicle 20 is approaching a portion of the track line 30 comprising a specific track segment of the first type 30a. Upon the vehicle 20 is approaching the portion of the track line 30 comprising the specific track segment of the first type 30a, the track segment control function 130 may be configured to activate the specific track segment of the first type 30a.

The light indicator control function 120 may be configured to, based on the position of the vehicle 20, determined by the vehicle position determining function 140, determine whether the vehicle 20 is approaching a portion of the track line 30 comprising a specific track segment of the first type 30a. Alternatively, or in combination, the light indicator control function 120 may be configured to determine whether the vehicle 20 is approaching the portion of the track line 30 comprising the specific track segment of the first type 30a from information provided by the track segment control function 130. Upon the vehicle 20 is approaching the portion of the track line 30 comprising the specific track segment of the first type 30a, the light indicator control function 120 may be configured to activate the light indicators 40, among the plurality of light indicators 40, being associated with the specific track segment of the first type 30a.

The track segment control function 130 may be configured to, based on the position of the vehicle 20, determined by the vehicle position determining function 140, determine whether the vehicle 20 is leaving a portion of the track line 30 comprising a specific track segment of the first type 30a. Upon the vehicle 20 is leaving the portion of the track line 30 comprising the specific track segment of the first type 30a, the track segment control function 130 may be configured to deactivate the specific track segment of the first type 30a.

The light indicator control function 120 may be configured to, based on the position of the vehicle 20, determined by the vehicle position determining function 140, determine whether the vehicle 20 is leaving a portion of the track line 30 comprising a specific track segment of the first type 30a. Alternatively, or in combination, the light indicator control function 120 may be configured to determine whether the vehicle 20 is leaving the portion of the track line 30 comprising the specific track segment of the first type 30a from information provided by the track segment control function 130. Upon the vehicle 20 is leaving the portion of the track line 30 comprising the specific track segment of the first type 30a, the light indicator control function 120 may be configured to deactivate the light indicators 40, among the plurality of light indicators 40, being associated with the specific track segment of the first type 30a.

Figure 2:
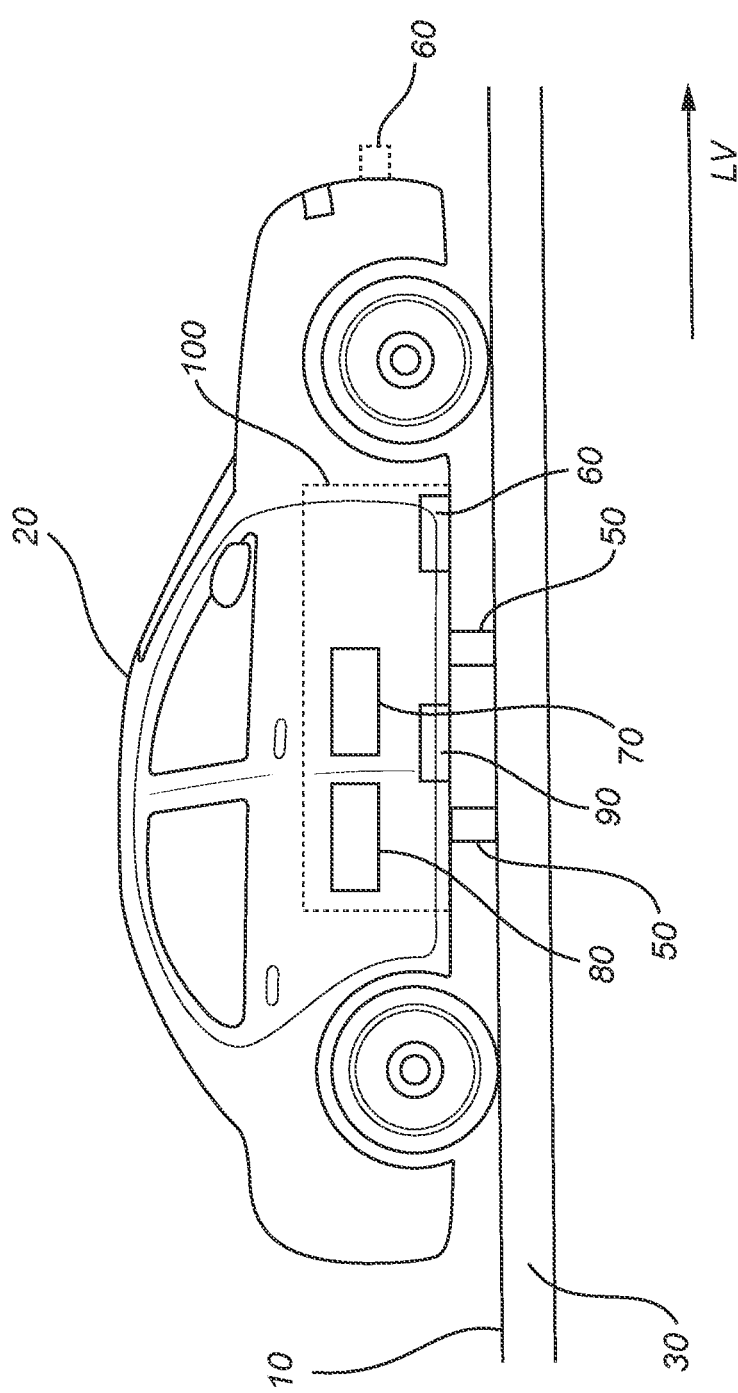
FIG. 2 is a side view of a vehicle driving on the electric road system of FIG. 1.

In connection with FIG. 2, a side view of an electric vehicle 20 driving on the electric road system of FIG. 1 is shown. The electric vehicle 20 comprises a sliding contact 50. The sliding contact 50 is part of an electrical power collector 70 mounted on the vehicle 20. The electrical power collector 70 is configured to collect electrical power from the track line 30 of the electric road system. The electrical power collector 70 typically comprise two or more sliding contacts 50. The sliding contacts 50 may be arranged under the vehicle 20. The sliding contact 50 may move laterally with respect to the longitudinal direction LV of the vehicle 20. The two or more sliding contacts 50 may be arranged along the longitudinal direction of the vehicle LV. A distance between the two contacts of the sliding contact may be in a range from 30 cm to 150 cm. Each of the two or more sliding contacts 50 is configured to make sliding contact with a different one of the track segments 30a, 30b of the track line 30 while the electric vehicle is driving along the track line 30. At an instant of time, at least one sliding contact 50 is configured to make sliding contact with a track segment of the first type 30a and at least one sliding contact 50 is configured to make sliding contact with a track segment of the second type 30b while the electric vehicle is driving along the track line 30. Doing so the electrical power collector 70 will be able to provide the vehicle 20 with electric power from the track line 30. A size of each contact of the sliding contact 50, along a lateral direction of the vehicle 20, may be in a range from 3 cm to 10 cm.

The electrical power collector 70 may be connected to a battery of the vehicle 20. The electrical power collector 70 may be connected to an electric motor of the vehicle 20. The electrical power collector 70 may supply electrical power for driving the vehicle 20. The electrical power collector 70 may be mounted anywhere in the vehicle 20. The electrical power collector 70 may be mounted under the vehicle 20

The vehicle 20 further comprises a control circuit 100 configured to control the electrical power collector 70, i.e. activate/deactive the same. The control circuit 100 may further be configured to guide a sliding contact 50 of the electrical power collector 70 such that it makes sliding contact with the track line 30 of the electric road system while the vehicle 20 is driving along the track line 30. The control circuit 100 comprises a camera 60 and processor 80.

The camera 60 is configured to capture a video stream. Especially, the camera 60 is configured to capture a video stream depicting the track line 30 while the vehicle is driving along the track line 30. This may be achieved by mounting the camera 60 on vehicle 20 such that the camera 60 is able to capture the video stream depicting the track line 30 while the vehicle is driving along the track line 30. The camera 60 may be mounted under the vehicle 20. Alternatively, or in combination, the camera may be mounted on a front portion of the vehicle 20, e.g., in the front of the vehicle close to a front bumper or behind an upper portion of the windscreen. There may be more than one camera 60 mounted on the vehicle 20.

The processor 80 may be a central processing unit (CPU), a microcontroller or a microprocessor. The processor 80 is configured to execute program code stored in a memory of the control circuit 100, in order to carry out operations and functions of the control circuit 100. The operations and functions of the control circuit 100 may be embodied in the form of executable logic routines, e.g., lines of code, software programs etc., that are stored on the memory and are executed by the processor 80. Furthermore, the operations and functions of the control circuit 100 may be a stand-alone software application or form a part of a software application that carries out additional tasks related to the control circuit 100. The described operations and functions may be considered a method that the control circuit 100 is configured to carry out. Also, while the described operations and functions will be discussed as implemented in software, such functionality may as well be carried out via dedicated hardware or firmware, or some combination of hardware, firmware and/or software.

The processor 80 is configured to execute a light indicator finding function. The light indicator finding function is configured to analyze the video stream captured by the camera 60. Especially, the light indicator finding function is configured to analyze the video stream depicting the track line 30 while the vehicle 20 is driving along the track line 30. The light indicator finding function may be configured to identify positions of active light indicators 40 arranged on the track line 30 within images of the video stream.

The processor may further be configured to execute a sliding contact guiding function. The sliding contact guiding function is configured to generate a guiding signal based on the identified positions of the active light indicators 40 as identified by the light indicator finding function. The control circuit 100 may further comprise an actuator 90 configured to move the sliding contact 50 laterally with respect to a longitudinal direction of the vehicle based on the guiding signal, thereby guiding the sliding contact 50. Alternatively, or in combination, the processor 80 may further be configured to execute a vehicle steering function. The vehicle steering function is configured to steer the vehicle 20 laterally with respect to a longitudinal direction of the track line 30 based on the guiding signal, thereby guiding the sliding contact 50.

The light indicator finding function may further be configured to identify active light indicators 40 in the video stream captured by the camera. Upon identification of active light indicators 40 in the video stream, the light indicator finding function may generate an electrical power collector activation signal. The electrical power collector activation signal may be sent to the electrical power collector 70. The electrical power collector activation signal may activate the electrical power collector 70. The activation of the electrical power collector 70 may activate the sliding contact 50 such that the sliding contact 50 may make a sliding contact with the track line 30. The sliding contact 50 may be moved downwards i.e. towards the road surface to make the sliding contact with the track line 30.

The light indicator finding function may further be configured to identify no active light indicators 40 in the video stream captured by the camera. Upon identification of no active light indicators 40 in the video stream, the light indicator finding function may generate an electrical power collector deactivation signal. The electrical power collector deactivation signal may be sent to the electrical power collector 70. The electrical power collector deactivation signal may deactivate the electrical power collector 70. The deactivation of the electrical power collector 70 may deactivate the sliding contact 50. The deactivated sliding contact 50 may be prevented from making a sliding contact with the track line 30. The sliding contact 50 may be lifted toward the vehicle i.e. away from the surface of the road to make no sliding contact with the track line 30.

The electrical power collector activation/deactivation signal may be generated based on defined criteria. For instance, the electrical power collector deactivation signal may be generated upon not identifying active light indicators 40 within a predefined time. The predefined time may e.g. be in the range of 0.5 to 3 seconds. By setting this predefined time sufficiently short, wear on the sliding contact 50 may be reduced.

The processor 80 may further be configured to execute a vehicle movement detection function. The vehicle movement detection function is configured to monitor a lateral movement of the vehicle 20. The vehicle movement detection function is further configured to, upon lateral movement of the vehicle 20 is above a predetermined threshold, generate an electrical power collector deactivation signal. A typical lateral movement of a vehicle 20 may be 0.3 m/s. The predetermined threshold may hence be set to be 0.5 m/s. Hence, if the vehicle is moving laterally above the predetermined threshold, e.g. in connection with changing lanes or departing from the road comprising the track line 30, the electrical power collector is informed by the electrical power collector deactivation signal and the sliding contact 50 may be lifted towards the vehicle 20, i.e. away from the surface of the road to make no sliding contact with the track line 30 or the road surface. Hence, wear of the sliding contact 50 may be reduced.

Figure 3:
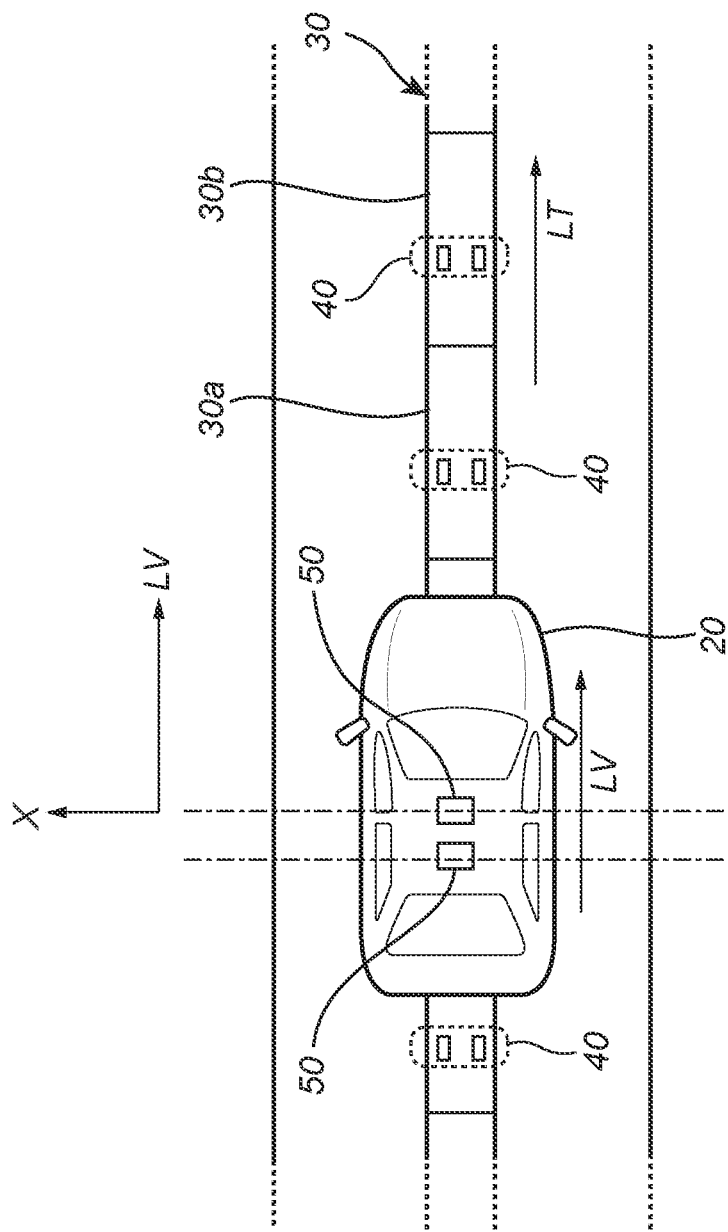
FIG. 3 is a top view of the vehicle driving on the electric road system of FIG. 1.

In connection with FIG. 3, a top view of FIG. 2 is shown. FIG. 3 shows positions of contacts of the sliding contact 50 with respect to the track line 30. The dashed lines of FIG. 3 indicate the lateral positions, positions along X direction, of the contacts of the sliding contacts 50. The guiding of the sliding contacts 50 may comprise moving the sliding contact 50 laterally, along X direction, with respect to the longitudinal direction LT of the track line 30. The moving of the sliding contact 50 along X direction may be performed such that the contacts of the sliding contact 50 make a sliding contact with the track line 30. As discussed above, the sliding contacts 50 may be guided laterally with respect to the longitudinal direction LT of the track line 30 by the actuator 90 of the control circuit 100. The actuator is set to be moving the sliding contacts 50 laterally with respect to a longitudinal direction LV of the vehicle 20, and hence also laterally with respect to the longitudinal direction LT of the track line 30, based on the guiding signal generated by the sliding contact guiding function. Alternatively, or in combination, as also discussed above, the sliding contacts 50 may be guided laterally with respect to the longitudinal direction LT of the track line 30 by steering the vehicle 20 laterally with respect to the longitudinal direction LT of the track line 30. The guiding of the sliding contacts 50 are performed such that the sliding contact 50 make a sliding contact only with the track line 30.

Figure 4:
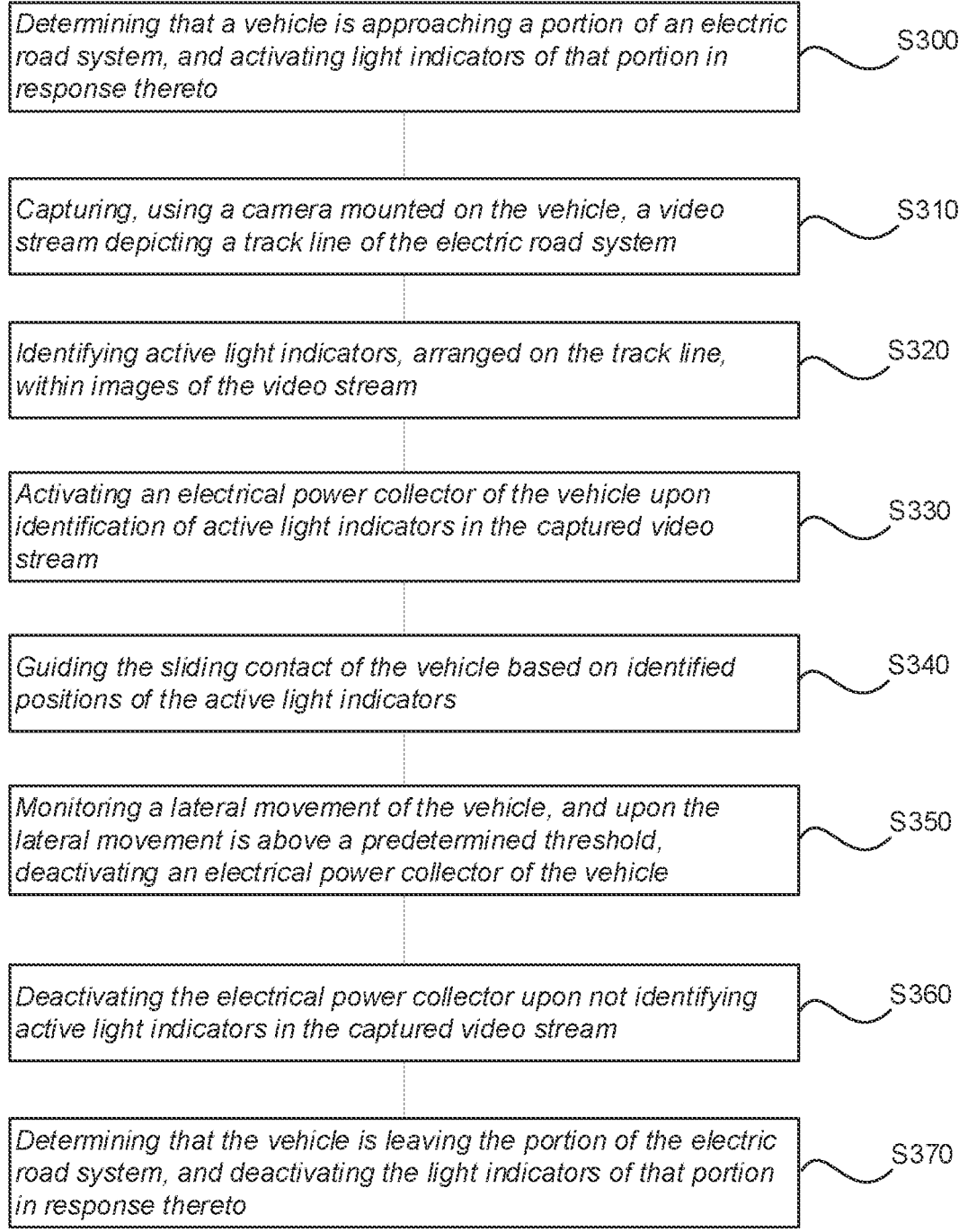
FIG. 4 is a block scheme of a method for guiding a sliding contact of an electrical power collector configured to collect electrical power from a track line of an electric road system of e.g.

In connection with FIG. 4, a block scheme of a method for controlling an electric road system and/or a vehicle 20 to collect electrical power from the electric road system is illustrated. The steps of the method may be performed in any order suitable. The method may comprises one or more of the following steps. The steps are preferably to be performed while the vehicle 20 is driving.

Determining S300 that a vehicle 20 is approaching a portion of the electric road system and activating the light indicators 40 of that portion in response thereto. The activation of the light indicators 40 of that portion may be performed by a light indicator controller 120, as described above.

Capturing S310, using the camera 60 mounted on the vehicle 20, a video stream depicting the track line 30 of the electric road system.

Identifying S320 active light indicators 40, arranged on the track line, within images of the captured video stream. The act of identifying S320 may comprise identifying positions of the active light indicators 40.

Upon identification of active light indicators 40 in the captured video stream, activating S330 the electrical power collector 70 such that the sliding contact 50 makes sliding contact with the track line 30.

Guiding S340 the sliding contact 50 of the vehicle 20 based on identified positions of the active light indicators 40. The step of guiding S340 the sliding contact 50 may comprise moving the sliding contact 50 laterally with respect to a longitudinal direction LV of the vehicle 20. Alternatively, or in combination, the step of guiding the sliding contact 50 of the vehicle 20 may comprise steering the vehicle 20 laterally with respect to a longitudinal direction LT of the track line 30.

Monitoring S350 a lateral movement of the vehicle 20, and upon the lateral movement is above a predetermined threshold, deactivating an electrical power collector of the vehicle such that the sliding contact 50 is prevented from making sliding contact with a surface of the road 10.

Upon not identifying active light indicators 40 in the captured video stream, deactivating S360 the electrical power collector 70 such that the sliding contact 50 makes no sliding contact with the track line 30 or a surface of the road 10.

Determining S370 that the vehicle 20 is leaving the portion of the electric road system, and deactivating the light indicators 40 of that portion in response thereto. The deactivation of the light indicators 40 of that portion may be performed by the light indicator controller 120, as described above.

The person skilled in the art realizes that the present invention by no means is limited to the preferred embodiments described above. On the contrary, many modifications and variations are possible within the scope of the appended claims.

For example, in addition to or instead of being arranged in or on a road, the track 30 may be arranged along a wall of a tunnel, e.g. a mine tunnel. The track 30 may then form part of a side railing.

Further, in addition to or instead of being configured to emit visible light, e.g. green light, the light indicator 40 may be configured to emit IR light. For example, the light indicator 40 may be configured to emit IR light in the active state. If so the camera 60 is configured to capture IR light.

Moreover, the light indicators 40 may be configured to emit pulsating light. The frequency of the pulsation may be in the range of 10-100 Hz. By pulsating the light, the emitted light may be easier to distinguish in e.g. strong sunlight.

Furthermore, it is also to be understood that a simpler track not being able to provide a vehicle with power but comprising the light indicators 40 may be used for steering a vehicle for lane keeping purpose, the vehicle being equipped with the camera 60. Also the track 30 discussed above may be used for steering a vehicle for lane keeping purpose, the vehicle being equipped with the camera 60.

Additionally, variations to the disclosed embodiments can be understood and effected by the skilled person in practicing the claimed invention, from a study of the drawings, the disclosure, and the appended claims.

What is claimed is:

1. A method for controlling of an electrical power collector configured to collect electrical power from a track line of an electric road system arranged along a road, the track line configured to being arranged on or in a surface of the road and comprising activatable light indicators arranged on the track line indicating an active or not active state of the track line, the electrical power collector being mounted on a vehicle, the method comprising:
    while the vehicle is driving:
        capturing, using a camera mounted on the vehicle, a video stream depicting the track line,
        identifying active light indicators in the captured video stream, and
        upon identification of the active light indicators, activating the electrical power collector such that a sliding contact of the electrical power collector makes sliding contact with the track line.

2. The method according to claim 1, further comprising:
    identifying positions of the active light indicators, arranged on the track line, within images of the video stream, and
    laterally, with respect to a longitudinal direction of the track line, guiding the sliding contact based on the identified positions of the active light indicators.

3. The method according to claim 2, wherein the step of guiding the sliding contact comprises moving the sliding contact laterally with respect to a longitudinal direction of the vehicle.

4. The method according to claim 2, wherein the step of guiding the sliding contact comprises steering the vehicle laterally with respect to a longitudinal direction of the track line.

5. The method according to claim 1, further comprising determining that the vehicle is approaching a portion of the electric road system, and activating the light indicators of that portion in response thereto.

6. The method according to claim 5, further comprising determining that the vehicle is leaving the portion, and deactivating the light indicators of that portion in response thereto.

7. The method according to claim 1, further comprising:
    monitoring a lateral movement of the vehicle, and
    upon the lateral movement is above a predetermined threshold, deactivating the electrical power collector such that the sliding contact is prevented from making sliding contact with a surface of the road.

8. The method according to claim 1, further comprising, upon not identifying the active light indicators in the captured video stream, deactivating the electrical power collector such that the sliding contact makes no sliding contact with the track line or a surface of the road.

9. A control system for controlling an electrical power collector configured to collect electrical power from a track line of an electric road system arranged along a road, the track line configured to being arranged on or in a surface of the road, the electrical power collector being mounted on a vehicle, the control system comprising:
    a plurality of activatable light indicators arranged on the track line and indicating an active or not active state of the track line; and
    a control circuit comprising:
        a camera configured to capture a video stream depicting the track line; and
        a processor configured to execute:
            a light indicator finding function configured to:
                identify active light indicators within images of the video stream and,
                upon identification of the active light indicators, generate an electrical power collector activation signal configured to activate the electrical power collector such that a sliding contact of the electrical power collector makes sliding contact with the track line.

10. The control system according to claim 9, wherein the light indicator finding function is further configured to identify positions of the active light indicators, arranged on the track line, within images of the video stream, and
    wherein the processor is further configured to execute a sliding contact guiding function configured to generate a guiding signal based on the identified positions of the active light indicators.

11. The control system according to claim 10, wherein the control circuit further comprises an actuator configured to move a sliding contact of the electrical power collector laterally with respect to a longitudinal direction of the vehicle based on the guiding signal, thereby guiding the sliding contact.

12. The control system according to claim 10, wherein the processor is further configured to execute a vehicle steering function configured to steer the vehicle laterally with respect to a longitudinal direction of the track line based on the guiding signal, thereby guiding a sliding contact of the electrical power collector.

13. The control system according to claim 9, wherein the processor is further configured to execute a vehicle movement detection function configured to:
- monitor a lateral movement of the vehicle, and
- upon the lateral movement is above a predetermined threshold, generate an electrical power collector deactivation signal.

14. The control system according to claim 9, wherein the light indicator finding function is further configured to:
- identify no active light indicators within images of the video stream and,
- upon identification of no active light indicators, generate an electrical power collector deactivation signal.

15. The control system according to claim 9, further comprising a control server comprising a server control circuit configured to execute a light indicator control function configured to individually activate/deactivate each of the plurality of light indicators.

16. The control system according to claim 15, wherein the server control circuit is further configured to execute a vehicle position determining function configured to determine a position of the vehicle,
- wherein the light indicator control function is further configured to, based on the position of the vehicle, determine whether the vehicle is approaching a portion of the track line comprising a specific track segment, and to activate light indicators of the portion of the track line approached by the vehicle.

17. The control system according to claim 15, wherein the server control circuit is further configured to execute a vehicle position determining function configured to determine a position of the vehicle,
- wherein the light indicator control function is further configured to, based on the position of the vehicle, determine whether the vehicle is leaving a portion of the of the track line comprising a specific track segment, and to deactivate light indicators of the portion of the track line left by the vehicle.

18. The control system according to claim 9, wherein, when in active state, the light indicator is configured to emit green light.

19. The control system according to claim 9, wherein, when in deactivated state, the light indicator is configured to emit red light.

20. The control system according to claim 9, wherein each of the plurality of light indicators comprises two or more individual light sources.

21. A method for guiding a sliding contact of an electrical power collector configured to collect electrical power from a track line of an electric road system arranged along road comprising the track line, the track line configured to being arranged on or in a surface of the road, the electrical power collector being mounted on a vehicle, the method comprising:
- while the vehicle is driving:
  - capturing, using a camera mounted on the vehicle, a video stream depicting the track line,
  - identifying positions of active light indicators, arranged on the track line indicating an active or not active state of the track line, within images of the video stream, and
  - laterally, with respect to a longitudinal direction of the track line, guiding the sliding contact based on the identified positions of the active light indicators.

22. A control circuit for controlling an electrical power collector configured to collect electrical power from a track line configured to being arranged on or in a surface of a road, the track line comprising activatable light indicators arranged along the track line and indicating an active or not active state of the track line, the electrical power collector and the control circuit being mounted on a vehicle, the control circuit comprising:
- a camera configured to capture a video stream depicting the track line; and
- a processor configured to execute:
  - a light indicator finding function configured to:
    - identify active light indicators within images of the video stream, and
    - upon identification of active light indicators, generate an electrical power collector activation signal configured to activate the electrical power collector such that a sliding contact of the electrical power collector makes sliding contact with the track line.

23. The control circuit according to claim 22,
- wherein the light indicator finding function is further configured to identify positions of active light indicators, arranged on the track line, within images of the video stream, and
- wherein the processor is further configured to execute a sliding contact guiding function configured to generate a guiding signal based on the identified positions of the active light indicators.

24. A control circuit for controlling an electrical power collector configured to collect electrical power from a track line configured to being arranged on or in a surface of a road, the track line comprising activatable light indicators arranged along the track line and indicating an active or not active state of the track line, the electrical power collector and the control circuit being mounted on a vehicle, the control circuit comprising:
- a camera configured to capture a video stream depicting the track line; and
- a processor configured to execute:
- a light indicator finding function configured to identify positions of active light indicators within images of the video stream, and
- a sliding contact guiding function configured to, while the vehicle is driving, generate a guiding signal based on the identified positions of the active light indicators, the guiding signal being configured to laterally, with respect to a longitudinal direction of the track line, guide the sliding contact based on the identified positions of the active light indicators.

* * * * *